H. M. HOLTON.
COUPLING FOR GAS CONDUITS.
APPLICATION FILED JAN. 6, 1909.

936,721.

Patented Oct. 12, 1909.

WITNESSES:
George L. Blume.
Leon. Hauerstein

INVENTOR
Herbert Miles Holton
BY
Edw. Saulwinkel
ATTORNEY

UNITED STATES PATENT OFFICE.

HERBERT MILES HOLTON, OF NEW YORK, N. Y.

COUPLING FOR GAS-CONDUITS.

936,721.  Specification of Letters Patent.  Patented Oct. 12, 1909.

Application filed January 6, 1909. Serial No. 471,005.

*To all whom it may concern:*

Be it known that I, HERBERT MILES HOLTON, a citizen of the United States, residing in the borough of the Bronx, in the city, county, and State of New York, have invented a certain new and useful Improvement in Couplings for Gas - Conduits, of which the following is a full, clear, and exact description.

The invention relates to couplings used for connecting a flexible pipe or tube to a gas spigot or the like and is specifically used in connection with my pyrographical device which is the subject matter of other patents.

My invention includes various features which will be evident from the following description and are particularly set forth in the claims.

Figure 3:
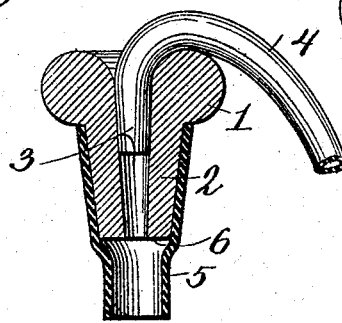
Figure 1:
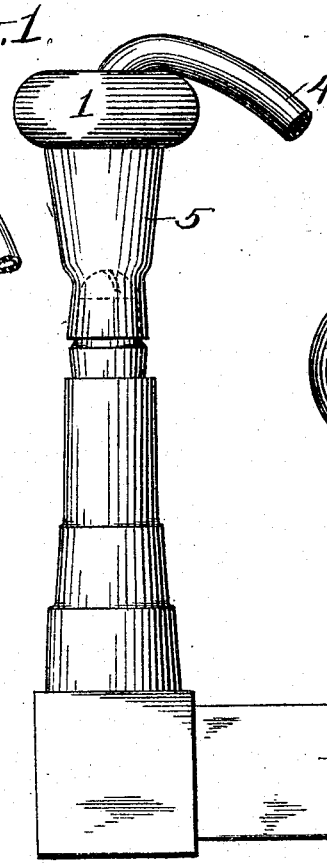
Figure 2:
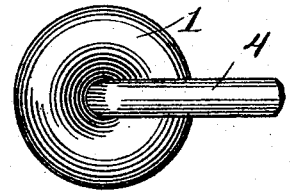
Figure 4:
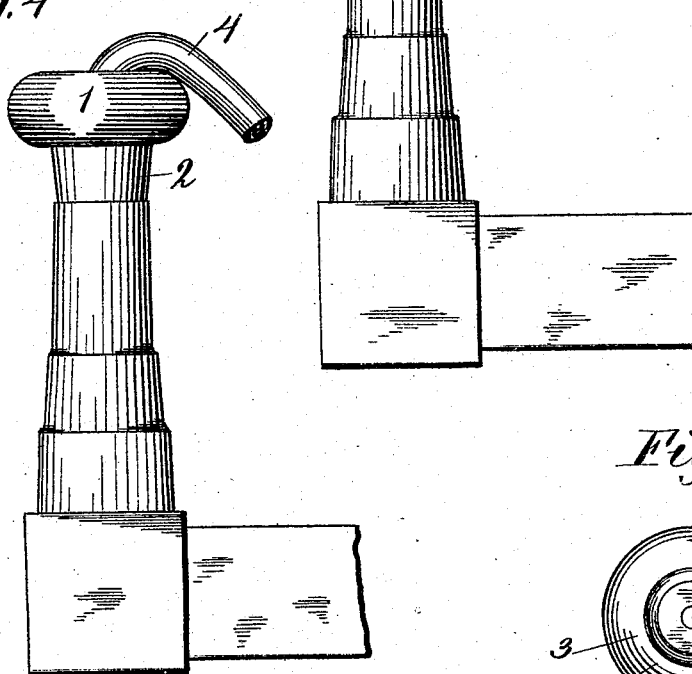
Figure 5:
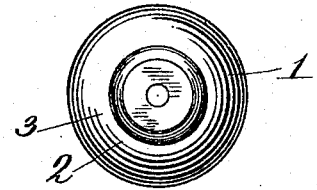

Referring to the accompanying one sheet of drawings in which similar characters of reference indicate like parts throughout the several views, Figure 1 is an elevation of my coupling attached to a gas spigot, provided with a non-removable tip. Fig. 2 is a plan view of the top thereof. Fig. 3 is a vertical section. Fig. 4 is an elevation of my coupling attached to a gas spigot provided with a removable cap. Fig. 5 is a plan view of the bottom of my coupling.

The invention consists of the member 1 provided with an annular top and depending neck 2. The neck, which is round and tapered on the outside, is provided with a tapered duct 3, extending through the center thereof, as shown in the sectional view Fig. 3. At the top of the duct 3 the sides diverge annularly, meeting the curved surface of the top in an unbroken curve. This curvature must be of greater or less radius, depending on the diameter and thickness of the flexible tube 4, as will be readily understood, to prevent the tube 4 from buckling when it is turned over the annular ring in any direction. The object of the tapering duct 3 is to cause the end of the flexible tube 4 to firmly contact the sides of the duct when said tube is pressed in, whereby a gas-tight connection is made. The object of the tapering neck 2 is to provide a means of making a gas-tight joint in the gas spigot after the gas tip has been removed, as shown in Fig. 4; and to provide a means for attaching a rubber sleeve 5, which can be used in case the gas tip is not removable from the spigot, as shown in Fig. 1.

In order to render this coupling, which is preferably made of wood, gas-tight, I cover the outside surface thereof with a shellac, wax, or other self-hardening liquid. As will be readily seen by referring to Fig. 3, the only place that this coating is necessary is at 6. This treatment closes the pores of the wood on the end and prevents the gas from escaping therethrough.

I wish it distinctly understood that my coupling herein illustrated and described, is in the form which I desire to construct it and that any changes or variations may be made as may be convenient or desirable without departing from the salient features of my invention, and I therefore intend the following claims to cover such modification as naturally fall within the lines of invention.

Having thus described my invention, what I claim as new and desire to secure by Letters Patent is,—

1. A coupling for gas conductors, consisting of an annular ring provided with an extension forming a neck, said neck adapted to contact with the inside of a gas spigot, and provided with a duct extending therethrough, and through the hole of the ring, the sides of said duct diverging at the top in a curve tangent to the ring.

2. A coupling for gas conductors consisting of an annular ring, having a reduced part forming a neck, said neck adapted to contact with the inner side of a gas spigot, and provided with a tapered duct extending therethrough, the walls of said duct making a continuous curve with the outer wall of the ring.

3. A coupling for gas conductors, consisting of a globe-like head, having a reduced part forming a neck, said neck and head provided with a duct extending therethrough, and adapted at the head to receive and hold a flexible tube; a nipple formed of a section of rubber hose, said hose being received over the neck and abutting said head at its inner end and contracted at its outer end; the lower end of said neck having a film of a self-hardening liquid thereon.

This specification signed and witnessed in 911 Flat-Iron Building, New York city, this 30th day of December, A. D., 1908.

HERBERT MILES HOLTON.

In the presence of:
EDWD. VAN WINKLE,
MARGUERITE ROBB.